United States Patent [19]

Thurston et al.

[11] 4,421,328

[45] Dec. 20, 1983

[54] HALF-KEYSTONE COMPRESSION RING

[75] Inventors: Kent W. Thurston, Timonium; Jesse H. Barnes, Severna Park, both of Md.

[73] Assignee: Koppers Company, Inc., Pittsburgh, Pa.

[21] Appl. No.: 428,215

[22] Filed: Sep. 29, 1982

[51] Int. Cl.³ .............................................. F16J 9/20
[52] U.S. Cl. ................................... 277/216; 277/236
[58] Field of Search ............................... 277/216–222, 277/236, 138, 156

[56] References Cited

U.S. PATENT DOCUMENTS 2,459,395  1/1949  Smith ................................... 277/216
4,123,072  10/1978  Sharpe ................................. 277/216

FOREIGN PATENT DOCUMENTS 2736657  2/1979  Fed. Rep. of Germany ...... 277/216

Primary Examiner—Robert S. Ward
Attorney, Agent, or Firm—Thomas L. Sivak; Herbert J. Zeh, Jr.

[57] ABSTRACT

An improved half-keystone compression ring for use in an internal combustion engine. The improved ring's bottom side is essentially flat, radially and circumferentially, in the closed operating position.

1 Claim, 1 Drawing Figure

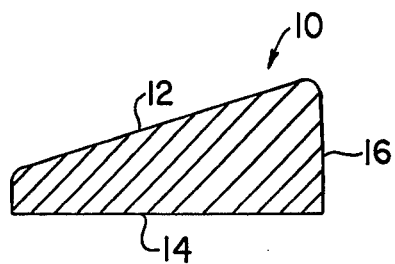

HALF-KEYSTONE COMPRESSION RING

FIELD OF THE INVENTION

This invention relates to compression rings for use in internal combustion engines and, more particularly, to half-keystone compression rings for use in turbocharged diesel engines.

BRIEF DESCRIPTION OF THE PRIOR ART

Half-keystone rings for use in internal combustion engines have been produced for a number of years. Half-keystone rings have not met with a great deal of commercial success in turbocharged diesel engines because they permit excessive oil consumption, stick in the grooves of the piston or scuff the cyliner wall liner. These drawbacks occur because the ring has a non-symmetrical cross section and the ring naturally distorts when closed to its operating diameter causing the critical bottom side sealing surface to become dished similar to a bellville washer. This natural occurring distortion causes undesirable flow restrictions, leakage paths and improper seating.

SUMMARY OF THE INVENTION

The present invention overcomes the foregoing problems of the prior art by providing a half-keystone compression ring which is essentially flat, radially and circumferentially, in the closed operating position.

BRIEF DESCRIPTION OF THE DRAWING

The FIGURE is a cross-sectional view of the half-keystone ring of the present invention.

DESCRIPTION OF THE PREFERRED EMBODIMENT

Referring to the FIGURE, a half-keystone ring, generally designated 10, has a top side 12, bottom side 14 and outside diameter 16. Ring 10 is made of centrifugally cast ductile iron and outside diameter 16 may be coated with a wear resistant material such as chrome in accordance with usual manufacturing procedures. The FIGURE shows the ring 180° from the ring gap and the angle the bottom side makes with the horizontal is 0° to plus or minus 8' in the closed position. This is in contrast to the prior art designs which have a bottom side angle of 0° to plus or minus 8' in the open position. The angle made by the bottom side with the horizontal is essentially the same at the ring gap.

While we have described a certain preferred embodiment of our invention, it will be understood that it may be otherwise embodied within the scope of the following claim.

What is claimed:

1. An improved half-keystone compression ring for use in an internal combustion engine, the improvement comprising an essentially flat bottom side of said ring when said ring is in the closed operating position, said bottom side forming a nominal angle of between 0° and plus or minus 8' with a horizontal surface.

* * * * *